US012287827B2

(12) United States Patent
Avram et al.

(10) Patent No.: US 12,287,827 B2
(45) Date of Patent: Apr. 29, 2025

(54) AUTOMATICALLY SUGGESTING ROUTINES BASED ON DETECTED USER ACTIONS VIA MULTIPLE APPLICATIONS

(71) Applicant: GOOGLE LLC, Mountain View, CA (US)

(72) Inventors: Diana Avram, Zurich (CH); Mugurel-Ionut Andreica, Adliswil (CH); Alice Liang, Sunnyvale, CA (US); Andrea D'olimpio, Zurich (CH); Cliff Kuang, San Francisco, CA (US); Andre Elisseeff, Basel (CH); Dana Ritter, Horgen (CH); Florian Hasler, Winterthur (CH); Radu Voroneanu, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/230,457

(22) Filed: Aug. 4, 2023

(65) Prior Publication Data

US 2025/0045327 A1   Feb. 6, 2025

(51) Int. Cl.
*G06F 16/638*  (2019.01)
*G06F 16/635*  (2019.01)
*H04L 67/50*  (2022.01)

(52) U.S. Cl.
CPC .......... *G06F 16/639* (2019.01); *G06F 16/636* (2019.01); *H04L 67/535* (2022.05)

(58) Field of Classification Search
CPC .... G06F 16/639; G06F 16/636; G06F 3/0482; G06F 3/04842; H04L 67/535
See application file for complete search history.

(56) References Cited

U.S. PATENT DOCUMENTS

| 2014/0289621 | A1* | 9/2014 | Sivakumar | G06F 9/45512 715/704 |
|---|---|---|---|---|
| 2019/0187987 | A1* | 6/2019 | Fauchère | G06F 9/3017 |
| 2021/0165639 | A1* | 6/2021 | Iyer | G06N 20/00 |
| 2022/0291932 | A1 | 9/2022 | Nouri | |

(Continued)

FOREIGN PATENT DOCUMENTS

EP   3920024 A1   12/2021

OTHER PUBLICATIONS

Prabhat Mishra et al., Alternate Action Recommender System Using Recurrent Patterns of Smart Home Users, Jan. 1, 2020, IEEE 17th Annual Consumer Communications & Networking Conference, pp. 1-6 (Year: 2020).*

(Continued)

*Primary Examiner* — Tam T Tran
(74) *Attorney, Agent, or Firm* — Gray Ice Higdon

(57) ABSTRACT

Implementations relate to identifying actions performed by a user while the user is interacting with multiple applications and providing a routine suggestion to the user based on the identified actions. While a user is interacting with one or more applications, the user actions are determined. The user actions are compared to one or more template routines and a template routine is selected that matches the actions of the user and provided to the user as a suggested routine. The suggested routine can be implemented by an automated assistant to perform the actions of the template by providing a corresponding command.

17 Claims, 10 Drawing Sheets

(56) References Cited

U.S. PATENT DOCUMENTS

2022/0334794 A1    10/2022  Lange
2024/0231896 A9 *  7/2024   Marks .................. G06F 9/3005

OTHER PUBLICATIONS

Shan Gao et al., Progressive Sequence Matching for ADL Plan Recommendation, Dec. 1, 2015, IEEE/WIC/ACM International Conference on Web Intelligence and Intelligent Agent Technology, pp. 360-367 (Year: 2015).*
Dhanish Semar et al., Automating SmartPhone Automation, Sep. 1, 2015, 24th Australasian Software Engineering Conference, pp. 108-117 (Year: 2015).*
Ville Antila et al., Routine Makers: Towards End-User Automation of Daily Routines Using Smartphones, Mar. 1, 2012, Work in Progress Session at PerCom, pp. 399-402 (Year: 2012).*
European Patent Office; International Search Report and Written Opinion issued in Application No. PCT/US2024/040850; 15 pages; dated Nov. 13, 2024.

* cited by examiner

AUTOMATICALLY SUGGESTING ROUTINES BASED ON DETECTED USER ACTIONS VIA MULTIPLE APPLICATIONS

BACKGROUND

A significant number of tasks that are performed by users on mobile devices are repetitive and may be performed multiple times a day and/or may be performed by multiple users in the same or a similar manner. In some instances, the series of steps that comprise a task may be difficult for a user to remember, may be time-consuming for the user to perform as needed, and/or may otherwise hinder a user from utilizing a mobile device to its fullest benefit.

For some tasks, a user may not know the full capabilities of a mobile device and may therefore perform some tasks less optimally than how the task(s) could otherwise be performed. Further, some tasks may require a user to access multiple applications, perform multiple steps in a particular order, and/or provide repetitive input in order to complete a task. Thus, user input can be prone to errors that can inhibit performance of a desired task.

SUMMARY

Techniques are described herein for selecting one or more automation suggestions, to provide to a user, that automates a sequence of actions previously performed by the user via multiple applications. The actions of a user are identified, including any parameters provided by the user, while the user is interacting with a plurality of applications that are executing on a mobile device. The identified actions of the user can be compared to one or more known app routines. The actions that are compared can include a series of actions that occurred before a determined indication that the user has completed the sequence (e.g., waiting a period of time without providing additional input, exiting an application, putting the mobile device in an inactive state) and, optionally, the comparison can occur after the user has completed the sequence. Based on similarity between the actions of the user and the actions of a candidate routine (or a "candidate routine template"), a routine can be suggested to the user. In subsequent interactions, the user can select to perform the suggested routine in lieu of performing the steps individually. For example, the user can: select (e.g., single-tap) an interface element that, when selected, causes automatic performance of the suggested routine and/or speak a phrase that corresponds to the suggested routine. When an indication is detected, the suggested routine is performed automatically. In these and other manners the suggested routine can be performed with a reduced quantity of user input(s) (e.g., providing a single-tap or a single spoken phrase). Thus, computing resources are conserved by requiring fewer inputs from the user.

As an example, a user may interact with a music playback application, start playback of a playlist of songs, and then navigate to a fitness application. While interacting with the fitness application, the user can start a workout routine. The user may perform this sequence of actions multiple times (e.g., every morning, at least three times, always following playing the particular playlist with interacting with the workout application). In this instance, a personal routine can be identified that includes the user interacting with the music application followed by the user interacting with the workout routine to start a workout. The personal routine can be suggested to the user as a personalized routine and provided with a shortcut to allow the actions of the routine to be automatically performed without additional interaction from the user.

For the previous example, an automated assistant can perform the same actions with minimal or no input from the user. For example, the user can be provided with an interactive element (e.g., an icon that appears in a particular location, such as on the home screen of the user's mobile device or an area for identified routines of the user). Also, for example, a routine can be suggested to a user with a command that, when uttered to an automated assistant, causes the routine to be performed. Thus, subsequently, the user can initiate performance of the routine by selecting the element and/or uttering the command phrase without performing additional actions. In many instances, a user may not be aware of the capabilities of an automated assistant that is executing on the user's mobile device. Thus, although the user may be able to perform a task with a single command to an automated assistant, the user may not do so. As a result, the user may be performing one or more tasks suboptimally (e.g., in a manner that utilizes excess battery life, memory, etc.) and/or in a manner that is prone to errors, which can prolong a duration of interaction of the user with the mobile device. Thus, by determining that a user has performed one or more actions that can be performed automatically by the automated assistant, and further providing the user with a suggestion to subsequently utilize the automated assistant to perform the action(s), a task that the user intends to be performed can be performed in a more efficient manner.

In some implementations, the user can interact with an interface of a mobile device to perform one or more actions that, when performed in a particular order (or "sequence"), can result in a task being completed. For example, actions of unlocking a mobile device, selecting an application, clicking on a particular button within an application, providing some input parameters, and/or other actions can be identified by one or more components that can identify the actions performed by the user. In some implementations, the user may explicitly indicate an interest in the user's actions being identified and/or the user may be prompted as to whether the user has interest in identifying potential automated assistant routines that may accomplish one or more of the tasks that the user is initiating via actions. The explicitly indicated interest can optionally be provided on an application by application basis, or on a system level basis. Thus, identification of user actions may only occur when the user is aware that the actions are being identified.

In some implementations, identifying actions of the user can include analyzing screenshots (or screen recordings) of the current interface of the user's mobile device and identifying one or more actions based on similarity between a current interface screen and one or more screenshots (or recordings) of interface screens that are associated with known actions. As user herein, "screenshots" can include both single screen captures of the actions of the user and/or can include a screen recording of multiple screen captures in sequence. For example, screenshots of a user interface can be provided as input to one or more machine learning models and output from the one or more machine learning models can be utilized to determine what action(s) are being performed by the user. Also, for example, one or more other image matching algorithms can be utilized to compare a screenshot with screenshots of interfaces where the action(s) of the user are known and determining what application the user is currently interacting with and the action being performed by the user based on visual similarity between the current screenshot of the user interface and the action associated with a visually matching screenshot.

In some implementations, structured application information can be utilized to determine one or more actions that are being performed by the user. Structured application information can include API calls that are being performed, hierarchical structure of an application and/or its components, accessibility tree information, and/or other structured data that may be generated in response to a user performing an action. For example, a user may touch a virtual button, via the mobile device interface, which results in navigation to a second interface screen. In order to facilitate the change in interface screen, one or more API calls may be generated by the application and provided to one or more other components of the mobile device. For example, the application can provide, to an automated assistant and optionally via an operating system of the device, API call(s) generated by the application. The generated API call(s) can be utilized to determine what action the user performed and how that action affected the performance of the application with which the user is currently interacting.

In some implementations, one or more screenshots (or screen recordings) can be captured of a user interacting with an application and the screenshots can be processed to determine one or more actions performed by the user. For example, a user may navigate to one or more interface screens while interacting with an application and one or more components can capture screenshots of the user interface as it changes from one interface screen to another. The interface screens can be compared to known images of interface screens and, via image matching, determine what action(s) by the user would cause the interface to update.

In some implementations, the user can interact with multiple applications in a sequence to perform a routine. For example, a user can interact with a first application, perform one or more actions, and then interact with a second application, whereby the user performs one or more additional actions. If the interaction with the first application and the interaction with the second application occur during the same session (e.g., between an action of unlocking a mobile device and an action of locking the mobile device), the sequence of actions can be identified as a possible multiple application routine.

In some implementations, one or more machine learning models can be utilized to determine the one or more actions performed by the user. For example, a machine learning model can be provided, as input, one or more screenshots captured while a user is interacting with an application. Output from the machine learning model can be utilized to determine one or more actions that were performed by the user while the user was interacting with the application. Output from the machine learning model can be, for example, one or more probabilities that a user interacted with an application via one or more actions, and the probabilities can be utilized to determine a likely action that was performed by the user.

In some implementations, user interface interaction data can be provided, with screenshots, to determine actions performed by the user. User interface interaction data can include, for example, locations on a user interface of a mobile application where a user has interacted by touching, positioning an icon, and/or otherwise indicating an interest in selecting an interface at a particular location. For example, as a user interacts with an application, the user may touch the screen of a mobile device to select one or more "virtual" buttons. The location of the screen where a user touches can be identified and provided, with screenshot information, to determine one or more actions that were performed by the user. In some implementations, at least a portion of the user interface interaction data can be provided, with screenshots, as input to a machine learning model to determine one or more actions performed by the user.

In some implementations, one or more components can identify performed user actions until the user has indicated that a task has been completed. In some implementations, the end of a task can be inferred based on one or more of the actions. For example, if an action is a "start" action, such as "begin music playback" or "start workout routine," the action can be identified as the final action of a series of actions. Similarly, if an action is an "end" action, such as a "stop playback of music" action and/or a "end workout" action, the action can be identified as the end of a series of actions. Other actions that can be identified as actions that indicate the end of a series of related actions include putting a mobile device in a standby, sleep, and/or inactive mode, stopping additional input for a period of time, and/or otherwise indicating that any subsequent actions are not related to the current task.

Once one or more actions are determined to be part of a set of actions related to performing a routine, and further that the set of actions is complete (i.e., a termination action has occurred), the one or more actions that were performed can be compared to templates of actions to determine whether the series of actions can be performed by an existing app routine. An app routine can include a series of actions that are related to each other such that the user is likely to perform the sequence of actions, in the same or a similar order, during subsequent interactions with the mobile device. The app routine can include an input trigger that, when provided by a user, can cause the actions of the routine to be performed. For example, a template may be for starting a "run workout," which can include one or more actions related to starting a "workout" playlist via a music application and selecting a "start run" via a fitness application executing on the mobile device. The template can include the actions of "open music application," "start 'workout' playlist," "open exercise application," select "run workout," and "start workout." Further, the template can be associated with an automated assistant command of "start run routine." Thus, when a user utters an utterance that includes the request "start run routine," the corresponding actions can be performed in a particular order to satisfy the request and perform the associated task.

In some implementations, when a user is provided with an indication of the routine template, the routine template may not be associated with a command. In those instances, the user may be prompted to associate a command with the routine template. Thus, in subsequent interactions with the automated assistant, the user can utter the user-generated command and, in response, the routine can be executed. For example, a routine template can be generated based on the user opening a music application, starting a particular playlist, opening a workout application, and starting a workout. Although a template may match one or more of the steps and be associated with a command (or not), the user can assign a command of "start my workout music and start workout," which can be stored with the routine for subsequent invocation by the user.

In some implementations, once a sequence of actions has been identified, the sequence can be stored as a candidate app routine. The candidate app routine can be utilized during subsequent interactions of the user to determine whether the user performs the same or a similar sequence of actions. For example, when a user first performs a sequence of actions, the sequence can be stored. When the user performs another sequence of actions, the new sequence can be compared to the stored sequence to determine a similarity between the sequences. If the new sequence of actions matches a stored sequence of actions with a threshold similarity, the stored candidate sequence can be provided to the user as a suggested app routine.

In some implementations, a sequence of user actions can be compared to one or more routine templates that have been previously generated. For example, one or more default routine templates can be generated based on known and/or common actions of users (e.g., logs of user activity and/or automated assistant logs of actions requested to be performed by the automated assistant). For example, a developer can generate one or more app routines that can be utilized as templates based on reviewing actions of other users. Also, for example, one or more machine learning models can be utilized to determine whether a sequence of actions is an app routine of interest to one or more users. Thus, when a user performs a sequence of actions that includes the user interacting with multiple applications during a session, the sequence of actions can be compared to one or more known routines (either personal to the user and/or that have been generated by one or more other users) and, if the sequence of actions corresponds to a routine, the routine can be provided to the user as a suggestion.

In some implementations, a template routine can include specifying one or more user inputs when the routine is executed. For example, a template routine may be a routine for "play <song>" and the routine can be executed when the user indicates to play a song. The song that is specified by the user can be utilized as input to the routine to cause the requested song to be played (e.g., "play 'Song 1'"). In some implementations, a template routine can map to a generic set of steps, such as a template that opens a news application, opens a social media application, and opens a web browser application without further input from the user.

In some implementations, the routine template that is provided to the user may not include all of the actions that were performed by the user and/or may include additional steps that were not performed by the user. For example, while performing a series of actions, the user may make a mistake and/or perform an action twice, which does not affect the performance of the task that the user has interest in performing. However, only the pertinent actions that facilitated performance of the task can be utilized to identify a template that can be provided to the user as a suggestion. In some implementations, an already existing template, which has been previously provided to the user as a suggestion, can be modified and/or otherwise changed and re-presented to the user as a new or updated routine suggestion based on similarity between the actions performed by the user and previous actions either performed by the user or as part of an existing routine template.

In some implementations, an action of the user may include the user inputting one or more parameters. The one or more parameters may be necessary to complete a task and a routine template that is identified as a suggestion to provide to the user may include an indication that one or more input parameters are required. For example, a series of actions to play a playlist can include the user inputting the name of a playlist. The routine template that is identified as matching the series of actions performed by the user can include an action of "input <playlist name>" and further, a command associated with the template may include the input parameter, such as a template command of "play <playlist> using Application A." Thus, the user can be provided with a suggestion to utilize the app routine subsequently when intending to play any playlist by uttering the phrase "play Playlist 1" and/or "play Playlist 2."

In some implementations, a user may be provided with a suggestion to utilize an app routine immediately after manually performing a series of actions. For example, a user may be provided with a link, via the interface of the mobile device that, when selected, provides the user with information related to the routine template that was identified via the actions of the user. The information can include a listing of the steps that comprise the routine, parameters that are required to utilize the routine (e.g., additional user input, selection of one or more preferences), and/or one or more shortcuts that can be utilized by the user to perform the routine (e.g., a command phrase that can be directed to an automated assistant, an icon that can be selected by the user to perform the routine).

In some implementations, the routine can be adjusted by the user to generate a custom routine. For example, when the user is provided with a suggestion, the user can select one or more of the actions of the routine and change the action taken when the routine is executed. For example, a routine suggestion for "navigate home" may be provided to a user that does not require additional parameters for the user (i.e., the routine automatically initiates providing driving directions to a "home" location of the user). The user may change the routine to instead require a destination as a parameter and the user can change the routine to generate a generic "navigate to <location>" routine that takes a location as a parameter and, in response, performs that actions of causing a mapping application to provide driving directions to a provided location.

In some implementations, a trigger criteria can be associated with an app routine that was suggested to the user. For example, an app routine template can be suggested to the user at a particular time of day, when one or more conditions of the mobile device are identified (e.g., when a particular application is accessed by the user), and/or an environmental condition of the mobile device (e.g., when the mobile device is identified in a particular geographic location). Thus, when the condition is satisfied, the user may be provided with the routine suggestion and the user can determine whether to execute the routine.

In some implementations, a suggested app routine can be customized by the user. For example, a command can be associated with an app routine that, when uttered by the user, causes the routine to execute. The command can be, for example, a suggested command and/or can be provided by the user (i.e., a customized command). Further, a trigger for when a routine is suggested to the user can be determined by the user and the routine can be stored with an association to the trigger so that the user is only provided with the routine suggestion when intended.

As used herein, "user action" refers to the one or more actions that were initially performed by the user. "Template action" refers to the one or more actions that are included in a template routine. In some implementations, user actions may correspond directly to template actions. In some implementations, a template may have more or fewer actions (e.g., a single template action may perform the same task as multiple user actions).

Techniques described herein reduce memory and resource consumption of one or more computing resources by mitigating the need for a user to perform multiple actions to fulfill an intent that can otherwise be performed with fewer actions and/or automatically by one or more other components. For example, by suggesting a routine to a user to fulfill an intent, the suggested routine may include fewer steps and/or require fewer input parameters than would be required to manually perform the same routine. Further, by suggesting a routine for the user to utilize to fulfill an intent, the process is prone to fewer user input errors, thus reducing instances whereby a user initiates a series of actions, performs one or more of the actions out of sequence or incorrectly, and is required to re-perform one or more actions to fulfill a given intent.

The above description is provided as an overview of some implementations of the present disclosure. Further description of those implementations, and other implementations, are described in more detail below.

DETAILED DESCRIPTION

Figure 1:
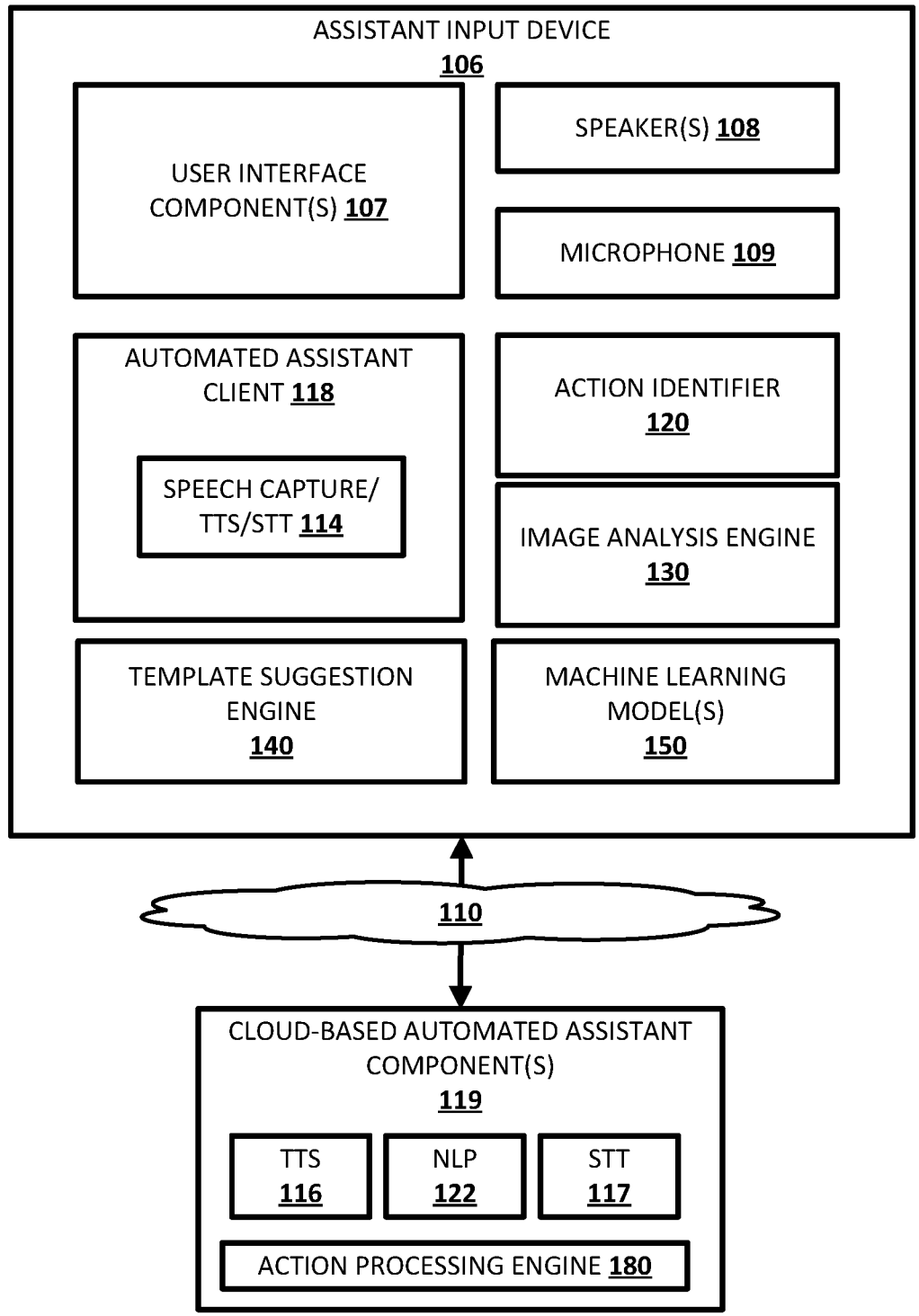
FIG. 1 is a block diagram of an example environment in which implementations disclosed herein can be implemented.

Turning now to FIG. 1, an example environment in which techniques disclosed herein may be implemented is illustrated. The example environment includes a plurality of assistant input devices 106 and one or more cloud-based automated assistant components 119. One or more (e.g., all) of the assistant input devices 106 can execute a respective instance of a respective automated assistant client 118. However, in some implementations one or more of the assistant input devices 106 can optionally lack an instance of the respective automated assistant client 118, and still include engine(s) and hardware components for receiving and processing user input directed to an automated assistant (e.g., microphone(s) 109, speaker(s) 108, speech recognition engine(s), natural language processing engine(s), speech synthesis engine(s), and so on). An instance of the automated assistant client 118 can be an application that is separate from an operating system of the respective assistant input devices 106 (e.g., installed "on top" of the operating system)—or can alternatively be implemented directly by the operating system of the respective assistant input devices 106. As described further below, each instance of the automated assistant client 118 can optionally interact with one or more cloud-based automated assistant components 119 in responding to various requests provided by respective user interface components 107 of any one of the respective assistant input devices 106. Further, and as also described below, other engine(s) of the assistant input devices 106 can optionally interact with one or more of the cloud-based automated assistant components 119.

One or more the cloud-based automated assistant components 119 can be implemented on one or more computing systems (e.g., server(s) collectively referred to as a "cloud" or a "remote" computing system) that are communicatively coupled to respective assistant input devices 106 via one or more local area networks ("LANs," including Wi-Fi LANs, Bluetooth networks, near-field communication networks, mesh networks, etc.), wide area networks ("WANs,", including the Internet, etc.), and/or other networks. The communicative coupling of the cloud-based automated assistant components 119 with the assistant input devices 106 is indicated generally by 110 of FIG. 1. Also, in some implementations, the assistant input devices 106 may be communicatively coupled with each other via one or more networks (e.g., LANs and/or WANs).

An instance of an automated assistant client 118, by way of its interactions with one or more of the cloud-based automated assistant components 119, may form what appears to be, from a user's perspective, a logical instance of an automated assistant with which the user may engage in a human-to-computer dialog. For example, a first automated assistant can be encompassed by a first automated assistant client 118 of a first assistant input device 106 and one or more cloud-based automated assistant components 119. A second automated assistant can be encompassed by a second automated assistant client 118 of a second assistant input device 106 and one or more cloud-based automated assistant components 119. The first automated assistant and the second automated assistant may also be referred to herein simply as "the automated assistant". It thus should be understood that each user that engages with an automated assistant client 118 executing on one or more of the assistant input devices 106 may, in effect, engage with his or her own logical instance of an automated assistant (or a logical instance of automated assistant that is shared amongst a household or other group of users and/or shared amongst multiple automated assistant clients 118). Although only a plurality of assistant input devices 106 are illustrated in FIG. 1, it is understood that cloud-based automated assistant component(s) 119 can additionally serve many additional groups of assistant input devices. Moreover, although various engines of the cloud-based automated assistant components 119 are described herein as being implemented separate from the automated assistant clients 118 (e.g., at server(s)), it should be understood that it is for the sake of example and is not meant to be limiting. For instance, one or more (e.g., all) of the engines described with respect to the cloud-based automated assistant components 119 can be implemented locally by one or more of the assistant input devices 106.

The assistant input devices 106 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), an interactive standalone speaker (e.g., with or without a display), a smart appliance such as a smart television or smart washer/dryer, a wearable apparatus of the user that includes a computing device (e.g., a watch of the user having a computing device, glasses of the user having a computing device, a virtual or augmented reality computing device), and/or any IoT device capable of receiving user input directed to the automated assistant. Additional and/or alternative assistant input devices may be provided. In some implementations, the plurality of assistant input devices 106 can be associated with each other in various ways in order to facilitate performance of techniques described herein. For example, in some implementations, the plurality of assistant input devices 106 may be associated with each other by virtue of being communicatively coupled via one or more networks (e.g., via the network(s) 110 of FIG. 1). This may be the case, for instance, where the plurality of assistant input devices 106 are deployed across a particular area or environment, such as a home, a building, and so forth. Additionally, or alternatively, in some implementations, the plurality of assistant input devices 106 may be associated with each other by virtue of them being members of a coordinated ecosystem that are at least selectively accessible by one or more users (e.g., an individual, a family, employees of an organization, other predefined groups, etc.). In some of those implementations, the ecosystem of the plurality of assistant input devices 106 can be manually and/or automatically associated with each other in a device topology representation of the ecosystem.

In some of those implementations, the automated assistant can identify one or more of the assistant input devices 106 to satisfy a spoken utterance from a user that is associated with the ecosystem. The spoken utterance can be satisfied by rendering responsive content (e.g., audibly and/or visually) at one or more of the assistant input devices 106, by causing one or more of the assistant input devices 106 to be controlled based on the spoken utterance, and/or by causing one or more of the assistant input devices 106 to perform any other action to satisfy the spoken utterance.

Additionally, or alternatively, in some implementations, one or more of the assistant input devices 106 may perform speaker recognition to recognize a user from their voice. For example, some instances of the automated assistant may be configured to match a voice to a user's profile, e.g., for purposes of providing/restricting access to various resources. Various techniques for user identification and/or authorization for automated assistants have been utilized. For example, in identifying a user, some automated assistants utilize text-dependent techniques (TD) that is constrained to invocation phrase(s) for the assistant (e.g., "OK Assistant" and/or "Hey Assistant"). With such techniques, an enrollment procedure is performed in which the user is explicitly prompted to provide one or more instances of a spoken utterance of the invocation phrase(s) to which the TD features are constrained. Speaker features (e.g., a speaker embedding) for a user can then be generated through processing of the instances of audio data, where each of the instances captures a respective one of the spoken utterances. For example, the speaker features can be generated by processing each of the instances of audio data using a TD machine learning model to generate a corresponding speaker embedding for each of the utterances. The speaker features can then be generated as a function of the speaker embeddings, and stored (e.g., on device) for use in TD techniques. For example, the speaker features can be a cumulative speaker embedding that is a function of (e.g., an average of) the speaker embeddings. Text-independent (TI) techniques have also been proposed for utilization in addition to or instead of TD techniques. TI features are not constrained to a subset of phrase(s) as is in TD. Like TD, TI can also utilize speaker features for a user and can generate those based on user utterances obtained through an enrollment procedure and/or other spoken interactions, although many more instances of user utterances may be required for generating useful TI speaker features.

After the speaker features are generated, the speaker features can be used in identifying the user that spoke a spoken utterance. For example, when another spoken utterance is spoken by the user, audio data that captures the spoken utterance can be processed to generate utterance features, those utterance features compared to the speaker features, and, based on the comparison, a profile can be identified that is associated with the speaker features. As one particular example, the audio data can be processed, using the speaker recognition model, to generate an utterance embedding, and that utterance embedding compared with the previously generated speaker embedding for the user in identifying a profile of the user. For instance, if a distance metric between the generated utterance embedding and the speaker embedding for the user satisfies a threshold, the user can be identified as the user that spoke the spoken utterance.

Each of the assistant input devices 106 further includes respective user interface component(s) 107, which can each include one or more user interface input devices (e.g., microphone, touchscreen, keyboard, and/or other input devices) and/or one or more user interface output devices (e.g., display, speaker, projector, and/or other output devices). As one example, user interface components 107 of assistant input device 106 can include only speaker(s) 108 and microphone(s) 109, whereas user interface components 107 of another assistant input device 106 can include speaker(s) 108, a touchscreen, and microphone(s) 109.

Each of the assistant input devices 106 and/or any other computing device(s) operating one or more of the cloud-based automated assistant components 119 may include one or more memories for storage of data and software applications, one or more processors for accessing data and executing applications, and other components that facilitate communication over a network. The operations performed by one or more of the assistant input devices 106 and/or by the automated assistant may be distributed across multiple computer systems. The automated assistant may be implemented as, for example, computer programs running on one or more computers in one or more locations that are coupled to each other through a network (e.g., the network(s) 110 of FIG. 1).

As noted above, in various implementations, each of the assistant input devices 106 may operate a respective automated assistant client 118. In various embodiments, each automated assistant client 118 may include a respective speech capture/text-to-speech (TTS)/speech-to-text (STT) module 114 (also referred to herein simply as "speech capture/TTS/STT module 114"). In other implementations, one or more aspects of the respective speech capture/TTS/STT module 114 may be implemented separately from the respective automated assistant client 118 (e.g., by one or more of the cloud-based automated assistant components 119).

Each respective speech capture/TTS/STT module 114 may be configured to perform one or more functions including, for example: capture a user's speech (speech capture, e.g., via respective microphone(s) 109); convert that captured audio to text and/or to other representations or embeddings (STT) using speech recognition model(s) stored in a database; and/or convert text to speech (TTS) using speech synthesis model(s) stored in a database. Instance(s) of these model(s) may be stored locally at each of the respective assistant input devices 106 and/or accessible by the assistant input devices (e.g., over the network(s) 110 of FIG. 1). In some implementations, because one or more of the assistant input devices 106 may be relatively constrained in terms of computing resources (e.g., processor cycles, memory, battery, etc.), the respective speech capture/TTS/STT module 114 that is local to each of the assistant input devices 106 may be configured to convert a finite number of different spoken phrases to text (or to other forms, such as lower dimensionality embeddings) using the speech recognition model(s). Other speech input may be sent to one or more of the cloud-based automated assistant components 119, which may include a cloud-based TTS module 116 and/or a cloud-based STT module 117.

Cloud-based STT module 117 may be configured to leverage the virtually limitless resources of the cloud to convert audio data captured by speech capture/TTS/STT module 114 into text (which may then be provided to natural language processing (NLP) module 122) using speech recognition model(s). Cloud-based TTS module 116 may be configured to leverage the virtually limitless resources of the cloud to convert textual data (e.g., text formulated by automated assistant) into computer-generated speech output using speech synthesis model(s). In some implementations, the cloud-based TTS module 116 may provide the computer-generated speech output to one or more of the assistant devices 106 to be output directly, e.g., using respective speaker(s) 108 of the respective assistant devices. In other implementations, textual data (e.g., a client device notification included in a command) generated by the automated assistant using the cloud-based TTS module 116 may be provided to speech capture/TTS/STT module 114 of the respective assistant devices, which may then locally convert the textual data into computer-generated speech using the speech synthesis model(s), and cause the computer-generated speech to be rendered via local speaker(s) 108 of the respective assistant devices.

The NLP module 122 processes natural language input generated by users via the assistant input devices 106 and may generate annotated output for use by one or more other components of the automated assistant, the assistant input devices 106. For example, the NLP module 122 may process natural language free-form input that is generated by a user via one or more respective user interface input devices of the assistant input devices 106. The annotated output generated based on processing the natural language free-form input may include one or more annotations of the natural language input and optionally one or more (e.g., all) of the terms of the natural language input.

In some implementations, the NLP module 122 is configured to identify and annotate various types of grammatical information in natural language input. For example, the NLP module 122 may include a part of speech tagger configured to annotate terms with their grammatical roles. In some implementations, the NLP module 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities.

The entity tagger of the NLP module 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the NLP module 122 may additionally and/or alternatively include a coreference resolver (not depicted) configured to group, or "cluster," references to the same entity based on one or more contextual cues. For example, the coreference resolver may be utilized to resolve the term "it" to "front door lock" in the natural language input "lock it", based on "front door lock" being mentioned in a client device notification rendered immediately prior to receiving the natural language input "lock it".

In some implementations, one or more components of the NLP module 122 may rely on annotations from one or more other components of the NLP module 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the NLP module 122 may use related data outside of the particular natural language input to determine one or more annotations-such as an assistant input device notification rendered immediately prior to receiving the natural language input on which the assistant input device notification is based.

Assistant input device 106 further includes an action identifier 120 that can determine that a user has performed one or more actions. In some implementations, action identifier 120 can monitor the user interface components 107 to determine when the interface has been updated. For example, action identifier 120 can determine that a graphical user interface has changed and, in response, capture an image of the interface. Thus, in some implementations, action identifier 120 can periodically capture screenshots of a graphical interface and provide the screenshots to one or more other components, such as image analysis engine 130, for further analysis and/or processing.

In some implementations, action identifier 120 can identify instances of the user interacting with one or more interfaces of assistant input device 106. For example, action identifier 120 can periodically determine whether the interface of assistant input device 106 has been updated and, in instances whereby the interface has changed in some manner, capture a screenshot of the interface. Also, for example, an application can provide action identifier 120 with an indication that the user is interacting with the application and, in response, action identifier 120 can capture a screenshot and/or request one or more other components to provide additional information regarding the action(s) performed by the user.

Figure 2:
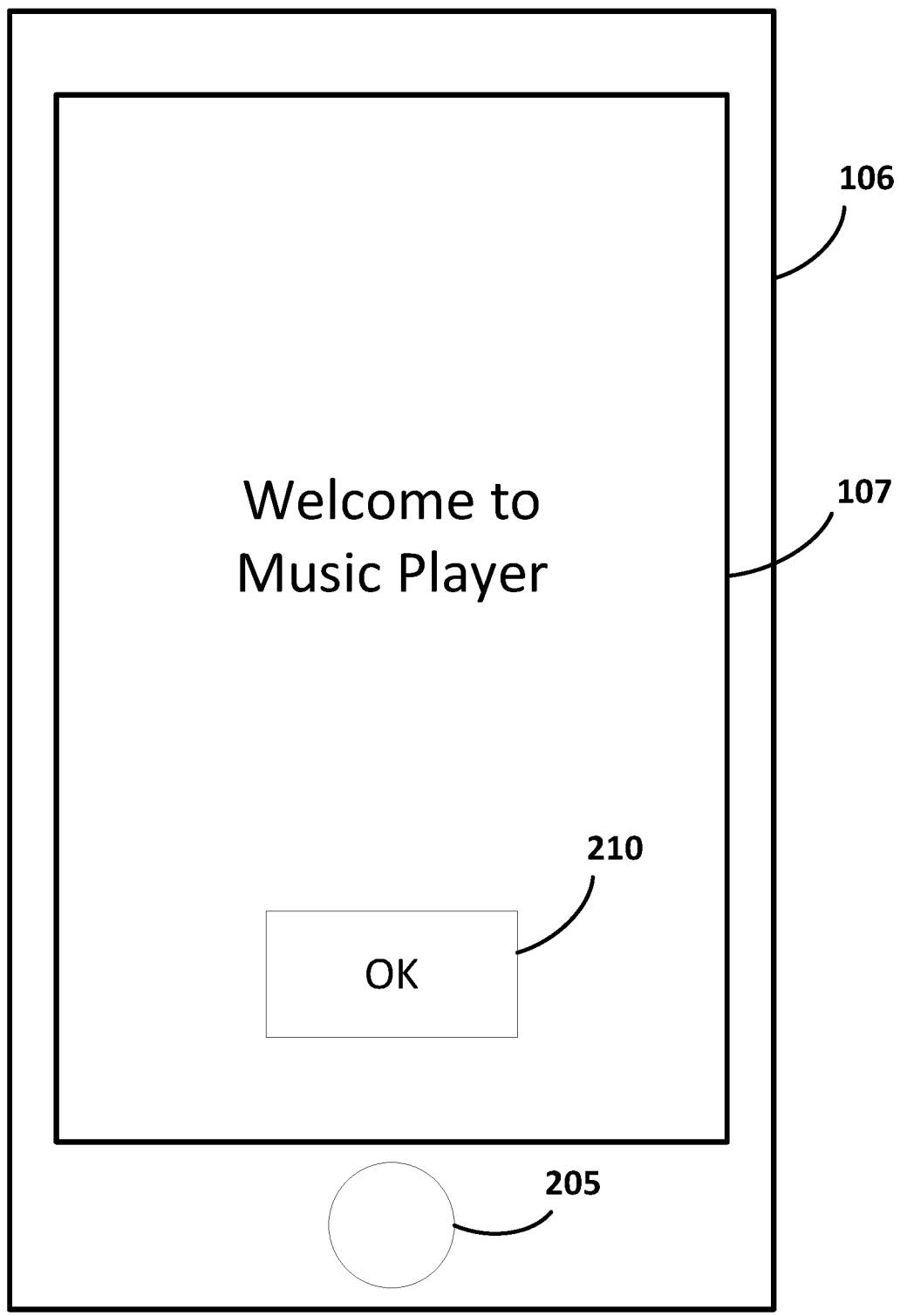
FIG. 2, FIG. 2B, FIG. 2C, and FIG. 2D depict example interfaces illustrated via a user interface of a user device.

As an example, a user may be interacting with a media playback application that is executing on assistant input device 106. Referring to FIG. 2A, assistant input device 106 is illustrated with interface 107 displaying a graphical user interface of the media playback application. The interface 107 includes a button 210 that the user can interact with by touching the interface 107. The assistant input device 106 further includes a physical button 205 that the user can press to cause one or more actions to occur. For example, the user can select the physical button 205 to cause the interface 107 to display a home screen and/or to cause the assistant input device 106 to enter a standby mode.

When the user selects the button 210, the interface 107 updates to display an additional graphical interface of the media playback application. When the user selects the button 210, the application can provide action identifier 120 with an indication that the user has selected a location of the interface 107 and further indicate coordinates where the user selected the interface 107. Further, action identifier 120 can capture a screenshot of the interface 107. Based on identifying the location where the user selected the interface and a screenshot of the interface, one or more components, such as image analysis engine 130, can determine an action that was performed by the user, as further described herein.

Figure 2B:
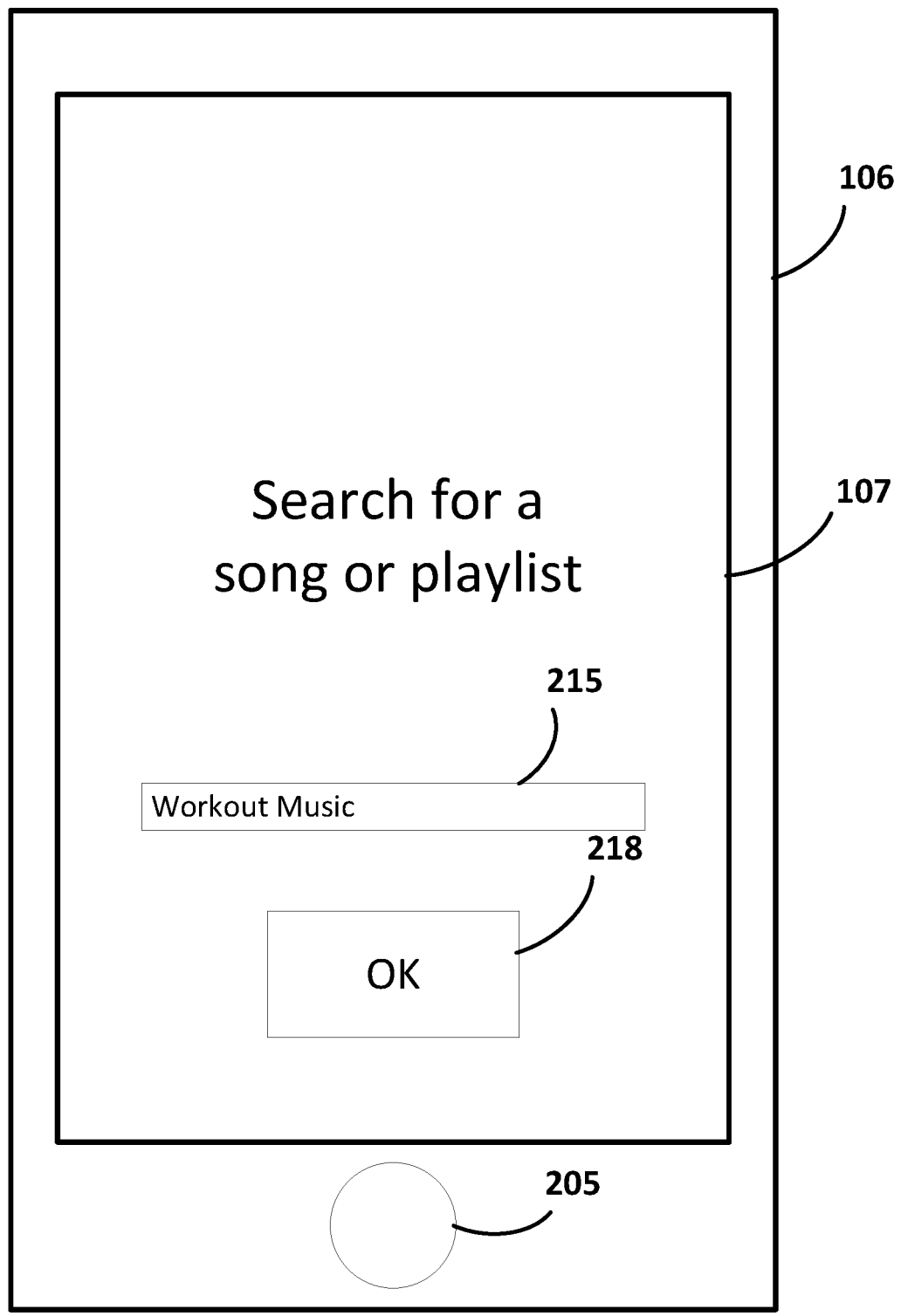

The graphical user interface illustrated in FIG. 2B includes a text box 215 to allow a user to enter textual information that can be utilized to identify a song and/or playlist that the user has interest in having played via the application. As illustrated, the user has entered "Workout Music" which may be a name of a song and/or a playlist that is accessible via the application. Once the user has entered the text into text box 215, the user can select the button 218 to cause the application to process the text that was entered into text box 215.

For each of the actions that were performed by the user, action identifier 120 may capture one or more screenshots and/or a recording of screenshots in a sequential order (i.e., a screen recording that captures multiple frames of user interactions). For example, when the user enters textual information into the text box 215, action identifier 120 can capture one or more screenshots of the user activity. Also, for example, when the user selects the button 218, the application (or another application executing on mobile device 106) can provide the action identifier 120 with an indication that the user has selected a button and action identifier 120 can capture one or more screenshots, identify locations on the interface where the user has interacted, and/or determine, based on additional information from the application, that the user has performed an action.

Figure 2C:
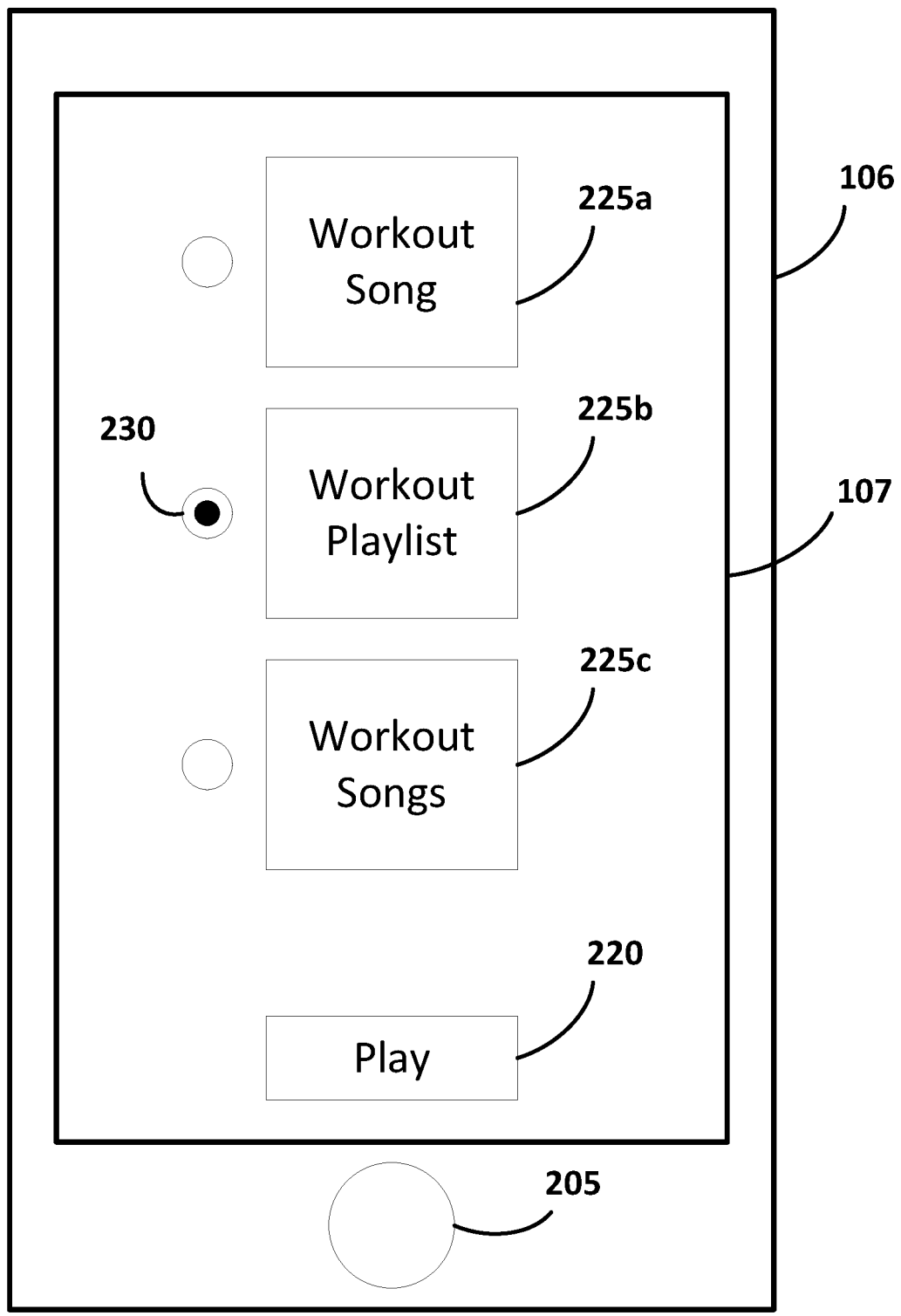

Referring to FIG. 2C, another graphical interface is illustrated that can be rendered via interface 107 by a media playback application. The graphical interface illustrates three possible selections that may fulfill the user request (as provided by the user via the text box of the interface illustrated in FIG. 2B). As illustrated, the possible selections include "Morning Song" 225*a*, "Workout playlist" 225*b*, and "Good Morning Songs" 225*c*. Each of the selections is further provided with a radio button, of which button 230 is selected. The user can interact with the interface 107 to select which of the selections (225*a*, 225*b*, and/or 225*c*) the user has interest in being played via the application. Once the user selects the correct selection, the button 220 can be selected to indicate a selection has been made.

As with previous interfaces, action identifier 120 can capture screenshots of the interface 107. For example, when the user interacts with button 220, a screenshot of the interface can be captured by action identifier 120. Also, for example, screenshots can be captured by action identifier 120 on a periodic basis and further utilized by image analysis engine 130 to determine one or more actions performed by the user while the user was interacting with the application. Further, user interface interaction data (e.g., indications of the user selecting a location of the interface, coordinates of the interface where the user selected) can be provided to action identifier 120 with screenshots which can be utilized by image analysis engine 130 to determine one or more actions that were performed by the user.

Figure 2D:
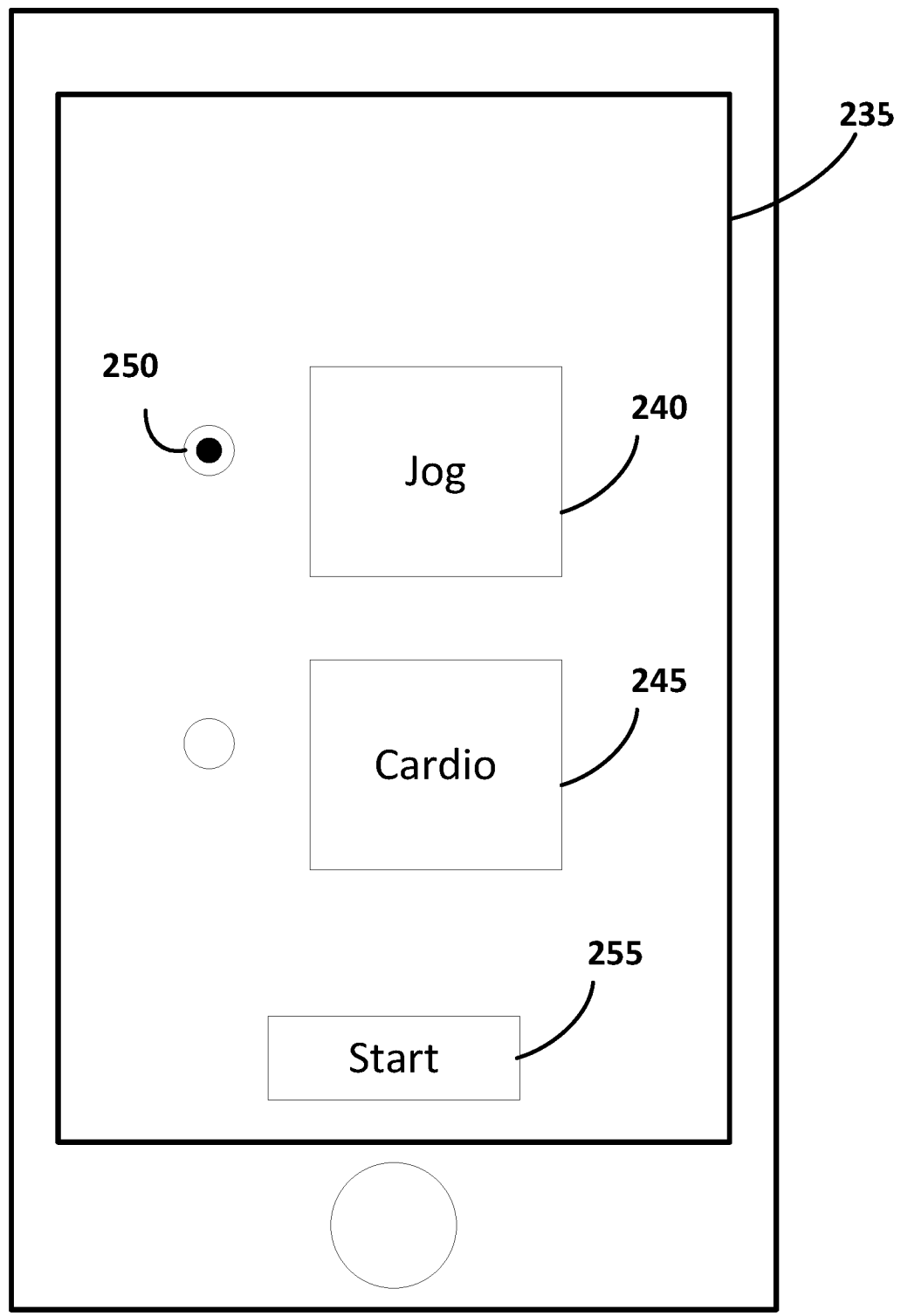

Referring to FIG. 2D, another example of a user interacting with an application is illustrated. In this instance, the user is interacting with a workout application and is provided with multiple workouts that the user can initiate. For example, the interface illustrates a "jog" workout 240 and a "cardio" workout 245. Through one or more interactions with the interface 235, the user has selected radio button 250 to initiate a "jog" workout. The user can then select start button 255 to start the workout routine (e.g., while the selected music playlist is being played).

Image analysis engine 130 can process one or more screenshots to determine one or more actions that were performed by the user while the screenshots were captured. For example, as previously described, action identifier 120 can capture one or more screenshots and provide the screenshots to image analysis engine 130 for further processing. In some implementations, additional information related to the actions of the user can be provided with the screenshots, such as user interface interaction data, API information from the application, hardware information related to the assistant input device 106, and/or other information related to the user interacting with an application that is executing on the assistant input device 106. In some implementations, the application with which the user is interacting can provide, in lieu of screenshots, one or more API calls that indicate what the user performed. For example, an API call of "Music_application ("Workout Playlist", start)" can be provided to action identifier 120 directly.

In some implementations, image analysis engine 130 can process one or more provided screenshots by comparing a given screenshot with one or more screenshots that are associated with known actions of a user. For example, image analysis engine 130 may have access to a plurality of images, each of which has been tagged with a particular action that is illustrated by the screenshot (e.g., "select OK button," "Enter <song title> in text box"). When image analysis engine 130 determines that an image matches an image that has been tagged with a particular action, image analysis engine 130 can determine that the action was performed by the user.

In some implementations, image analysis engine 130 can utilize one or more machine learning models 150 to determine actions that were performed by the user while the images were captured. For example, a trained machine learning model can receive, as input, one or more screenshots of an interface. Output from the machine learning model can be utilized to determine an action that was performed by the user while the screenshot(s) were captured. For example, the machine learning model 150 can provide, as output, one or more probabilities that a particular action (or plurality of actions) were performed. The probabilities can be utilized to determine the most likely action that was performed by the user (and/or that an action can be determined with a threshold certainty), and a series of actions that resulted in the user performing a routine can be determined.

In some implementations, image analysis engine 130 can utilize one or more machine learning models 150 that provide, as output, an embedding in a vector space that can be compared to one or more other embeddings that correspond to known actions. For example, one or more embeddings, generated based on processing one or more screenshots, can be tagged with a template routine. When a screenshot is processed using the machine learning model, the machine learning can provide, as output, an embedding that can be compared to the embeddings in a vector space and, based on proximity between the new embedding and other embeddings, one or more template routines can be selected. Also, for example, embeddings can be tagged with known actions that were performed while the screenshot was captured and an action can be associated with the new embedding based on proximity between the new embedding and one or more known action embeddings.

In some implementations, image analysis engine 130 can utilize one or more vision language models (VLM) to identify, based on interface screenshots, actions performed by a user while the user is interacting with an application. For example, a VLM can be provided, as input, one or more screenshots and a prompt to provide, as output, one or more actions that were performed by the user. Prompts can include, for example, "describe what action was performed by the user," "provide, using nomenclature of <application>, the performed actions," and/or one or more other prompts that can result in the VLM providing, as output, an action that was performed by the user while the user was interacting with the interface as illustrated in the provide screenshot(s) and/or while interacting with "<application>." Also, for example, a VLM can be provided with a screenshot and a listing of possible actions and be prompted to "select which, if any, of these actions was performed by the user."

In some implementations, image analysis engine 130 can determine that a particular action is a terminating action of a routine. A terminating action of a routine is a final action that is performed by the user, in a series of actions, to perform a particular task. For example, a user may have a task of navigating to a home location, and the final action of the routine can include selecting a "Start Directions" button via a mapping application. Thus, when the image analysis engine 130 determines that a terminating action has been performed, the one or more actions that have been identified from the screenshots of the user interactions can be provided to template suggestion engine 140 for further analysis.

In some implementations, once it is determined that a user has completed a routine, the routine can be stored as a candidate user-generated routine. For example, the user may select a particular playlist and then start a workout routine. Also, for example, the user can use a ride sharing application to order a ride and then check emails via an email application. In some implementations, once a user has performed a series of actions a threshold number of times, the routine can be stored as a candidate template routine that can subsequently be provided to the user as a routine suggestion.

In some implementations, one or more trigger criteria can be associated with a routine. For example, if the user orders a ride via a ride sharing application and checks emails every weekday morning at 8 am, the routine can be tagged with that information as a trigger criteria. The trigger criteria can then be utilized to determine when a routine suggestion is provided to the user, as described herein.

Once one or more actions are determined, template suggestion engine 140 can select a template routine to provide as a suggestion. Template suggestion engine 140 can compare the one or more actions that were identified by image analysis engine 130 to one or more templates, each of which can include one or more template actions. For example, a template routine for "navigating to <location>" can include the actions of "open mapping application," "enter <location> in text box," and "select 'start directions' button" as actions. The user actions that were identified can include "open mapping application," "enter 'home' in text box," and "select 'start directions' button" as identified user actions. The template routine for "navigating to <location>" can be selected as a suggestion to provide to the user based similarity between the template actions and the identified actions of the user.

In some implementations, a template routine can be selected that includes one or more parameters as input. Referring again to the previous example, the "navigating to <location>" template routine requires a "location" parameter. Because one of the actions of the user included providing input (i.e., a "location"), the template suggestion engine 140 can select the "navigating to <location>" template routine based at least in part on the user providing input that matches the required parameter for the template routine.

In some implementations, the selected template routine may not include template actions that correspond to actions that were identified as being performed by the user. For example, a user may perform an action of entering a parameter into a text box, selecting an "OK" button, and then selecting a "back" button to return to the previous screen (e.g., to correct a spelling error when the parameter was initially entered into the text box). The user may then enter a new parameter into the text box and select the "OK" button. Thus, the actions of the user include "enter <parameter>," "select 'OK'," "select 'Back'," "Enter <parameter>," and "select 'OK'." However, template suggestion engine 140 may determine that one or more of the actions were extraneous and select a template routine that does not include the user selecting "Back" and entering the parameter twice. Also, for example, the user may perform one or more actions that are indicative of a single API to an application, as previously described. For example, the user may perform three steps to start a music playlist and the same action can be performed via a single call to the music application to start a particular playlist.

Figure 3:
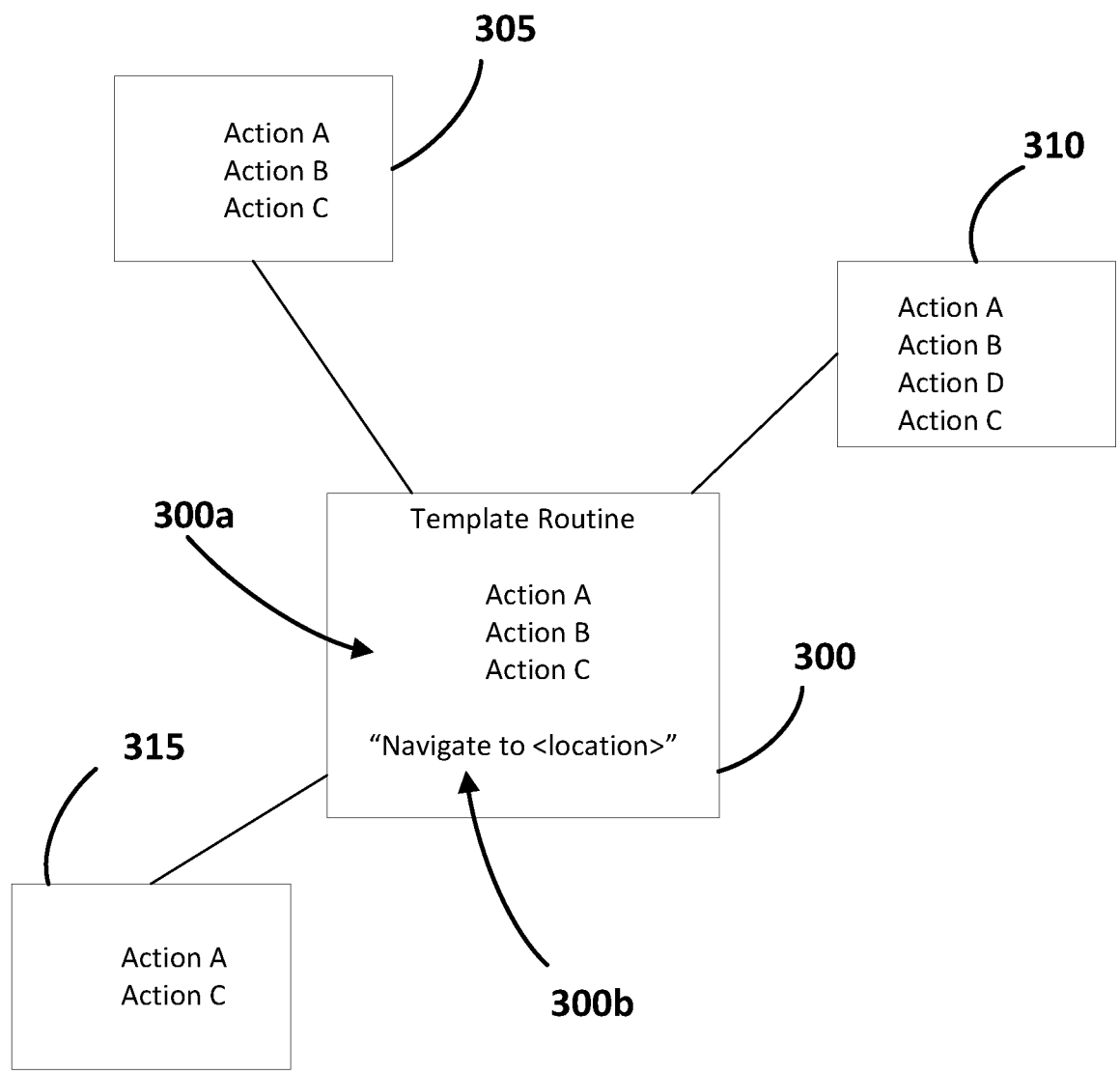
FIG. 3 illustrates template actions mapped to a template routine.

As an example, referring to FIG. 3, an example of a template routine is illustrated with a plurality of possible actions associated with the template. The template routine includes a plurality of actions that are associated with the template routine. If the template routine is provided as a suggestion to the user, the actions 300a can be caused to be performed. For example, the user can provide the command 300b to an automated assistant and the automated assistant can cause performance of the actions 300a.

As illustrated, a plurality of different action sequences are provided that map to the template routine 300. For example, action sequence 305 includes "Action A," followed by "Action B," and followed by "Action C." When the actions of a user are identified and the actions match the actions of sequence 305, template routine 300 can be provided as a suggestion. In this instance, the template routine 300 has the same template actions 300a as the sequence 305. However, in some instances, the user may perform the actions illustrated in sequence 310, which includes "Action D." Because the sequence 310 is mapped to the template routine 300, template routine 300 can be provided to the user as a template suggestion. "Action D" can be, for example, an unnecessary step that was performed by the user and/or a less efficient action than what is required to perform the action of "Navigate to <location>." Finally, sequence 315 maps to template routine 300. However, sequence 315 does not include "Action B," which may not have been performed by the user and/or was not identified as being performed by the user. However, template routine 300 can still be provided to the user as a suggestion.

In some implementations, the suggestion can be provided to the user via the interface 107. For example, referring to FIG. 4, a selectable element 405 can be provided immediately after the user has performed a task. By selecting the element 405, the user can be provided with the actions that comprise the routine and additional information regarding how the user can initiate the routine for subsequent interactions with the application. For example, the user can be provided with a shortcut and/or a command that can be provided to an automated assistant.

In some implementations, the suggestion can be provided as a selectable element that is displayed via the interface 107. For example, an icon may be rendered via the interface 107 that, when selected, causes the routine to be performed.

The icon can be rendered on, for example, a home screen of the assistant input device 106, a particular screen area (e.g., a location where all routine suggestion icons are displayed), and/or via the interface of the application (e.g., an element that is rendered via the interface when the user opens the application).

In some implementations, the routine suggestion can be provided to the user based on a trigger criteria. The trigger criteria can include, for example, a time, a location of the mobile device, a state of the mobile device (e.g., when a particular application is accessed), and/or other environmental conditions and device state conditions that indicate when a user typically performs the routine. When the trigger criteria is satisfied, the suggestion can be provided to the user.

Figure 4:
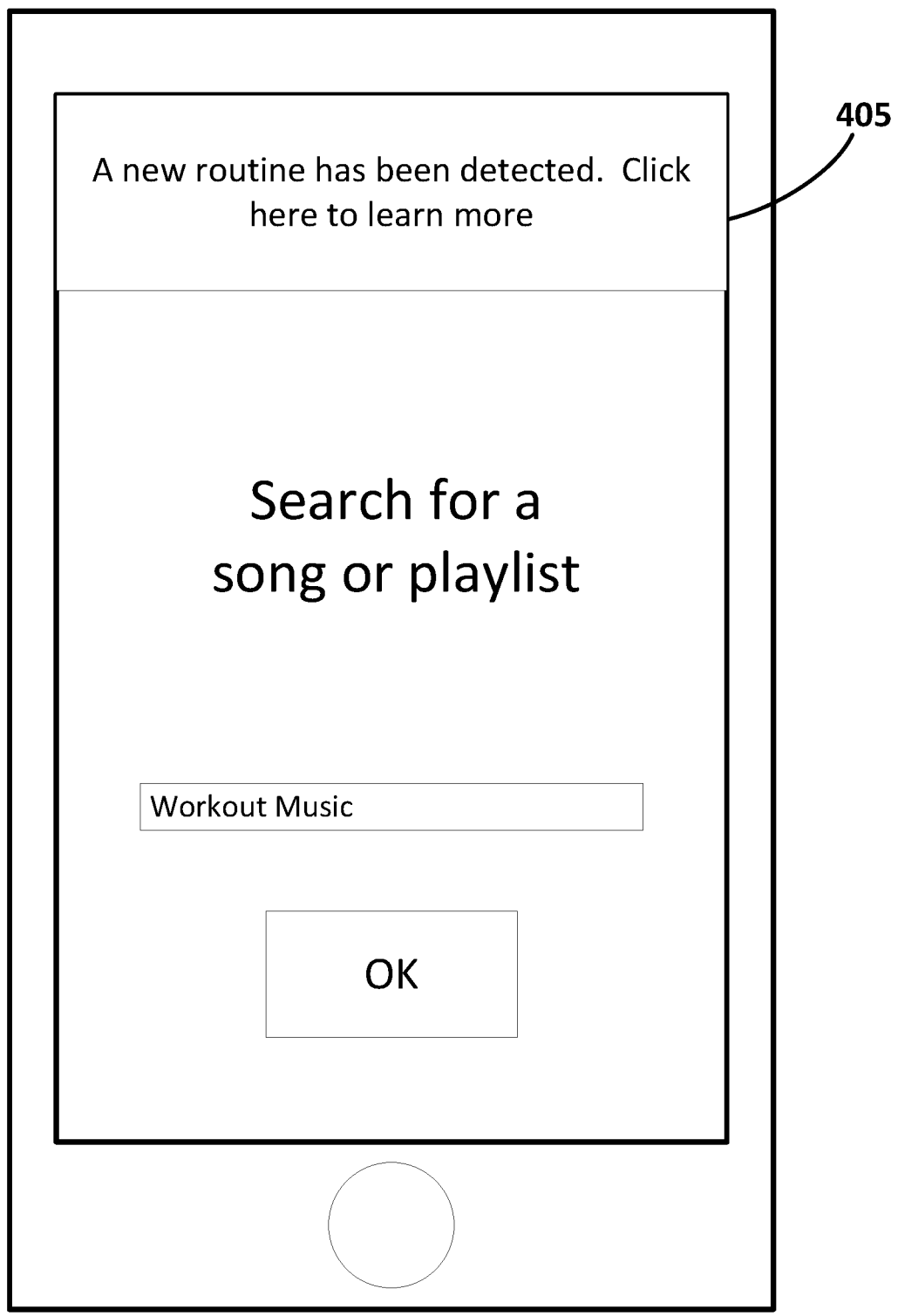
FIG. 4 illustrates a template suggestion provided based on a trigger criteria being satisfied.

For example, referring to FIG. 4, a suggestion 405 is provided when the user accesses the music application. Thus, when the user initiates a routine's first action, the suggestion to complete the routine can be provided. Subsequently, if the user initiates the routine via the action, another indication of the suggestion can be provided to the user, such as an icon on a home screen of the mobile device. In some implementations, the user can be provided with the actions that are included in a routine and adjust one or more of the actions to customize the action for utilization at a later time.

Figure 5:
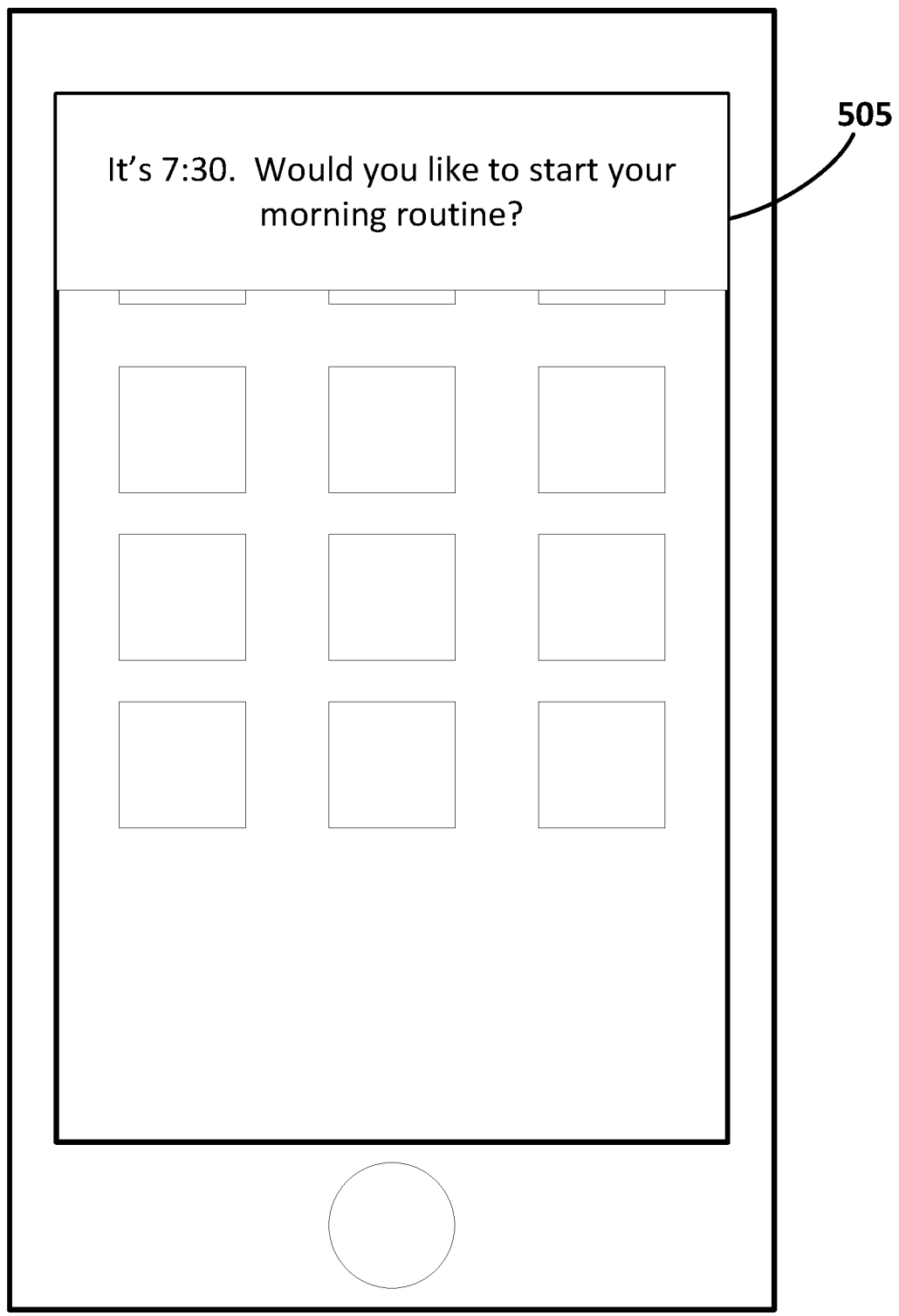
FIG. 5 illustrates another example of a template suggestion provided based on another trigger criteria being satisfied.

Referring to FIG. 5, a routine suggestion is provided based on a time condition. As previously described, the user may have performed a routine at the same time for a number of times and a trigger that is associated with that time may be associated with the template routine. Thus, when that trigger criteria is satisfied, the user can be provided with suggestion 505 to suggest starting the routine. In some implementations, a notification and/or other indication of the suggestion can be provided to the user such that the user is aware that a suggestion is being provided and the user can be provided with an option to initiate the routine.

In some implementations, the suggestion can be provided to the user via an automated assistant that is executing, at least in part, on assistant input device 106. For example, automated assistant client 118 can generate a suggestion and cause the suggestion to be rendered, either visually via interface 107 and/or audibly via speaker(s) 108. Thus, for example, when a user completes a routine, a suggestion can be provided to the user as synthesized speech, such as the automated assistant 118 rendering audio that includes an indication of the suggestion (e.g., audibly rendering "You may want to use this shortcut next time" and rendering a shortcut icon via the interface 107). Subsequently, when the user selects the icon, the automated assistant 118 can cause the one or more actions associated with the routine to be performed.

In some implementations, a suggestion can include a routine command that, when uttered by the user, can cause the automated assistant to perform the one or more template actions that are associated with the routine. For example, a suggested routine to get directions to a location can be associated with a command of "Give me directions to <location>," and the user can utter the command as a request to the automated assistant 118, whereby the automated assistant 118 can cause the one or more template actions associated with the template to be performed via action processing engine 180. In some implementations, the routine command can include one or more parameters that are required at the time that the automated assistant executes the routine. For example, in some instances, a command may not require any additional information, such as "Start a workout routine," whereas other commands may require additional information that the user can provide with the command, such as "Give me directions to <location>."

In some implementations, once a user has been provided with a routine suggestion, the user may amend and/or alter the provided routine to generate a custom routine. For example, the user can be provided with a suggested routine that matches a known routine template. However, the user may have interest in adding additional actions and/or removing one or more actions from the routine and further storing the amended routine for future usage. Thus, in some implementations, the stored routine may be unique to the user and can be stored locally on the assistant input device 106 for later usage by the user. Other examples of customization of suggested routines can include the user changing a name of a routine, a command to invoke an automated assistant to execute the routine, changing one or more parameters for a routine, and/or changing a trigger criteria associated with the suggestion.

Figure 6:
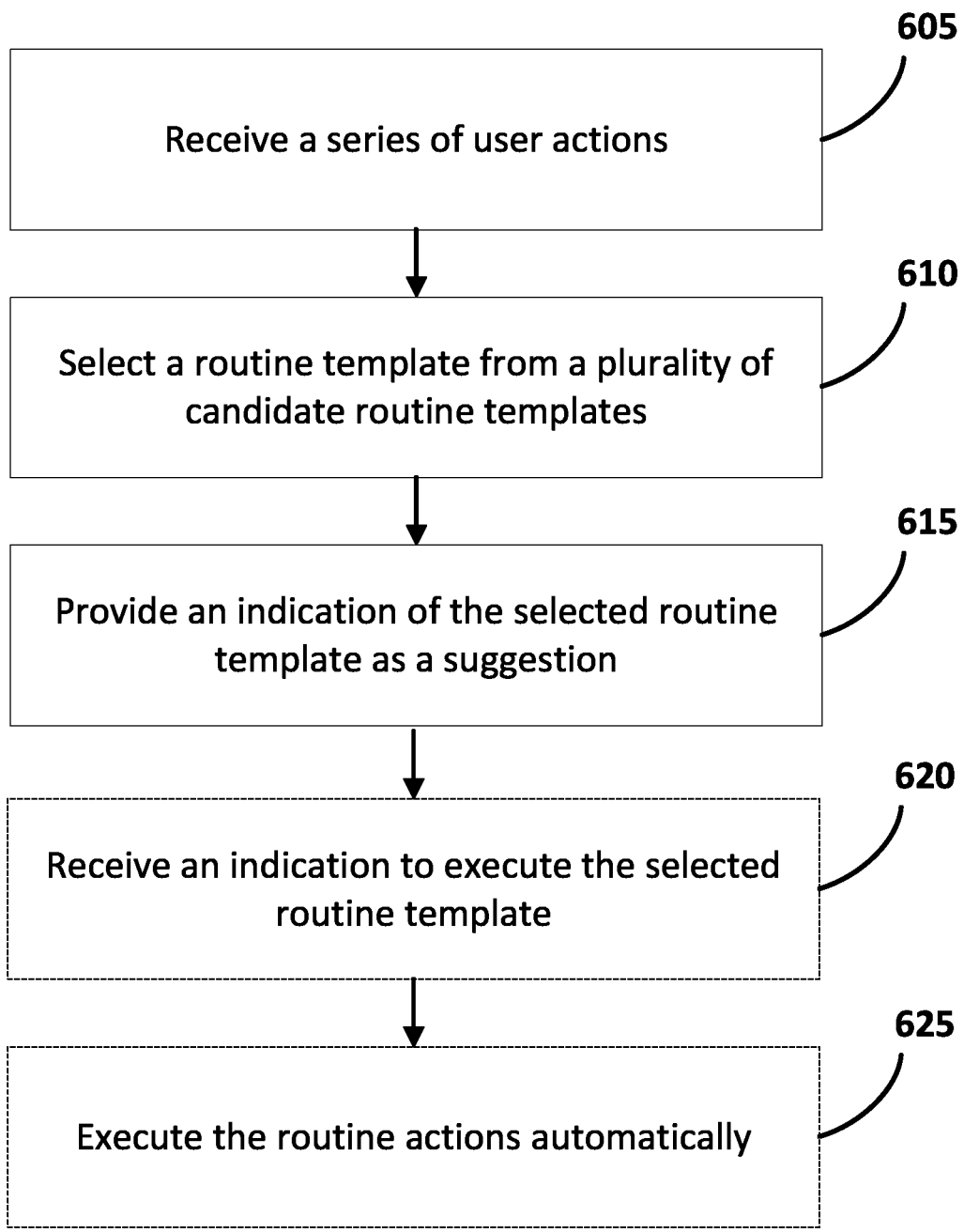
FIG. 6 depicts a flowchart illustrating an example method according to various implementations disclosed herein.

Referring to FIG. 6, a flowchart is provided that illustrates a method for providing a routine suggestion to a user based on previous actions performed by the user. In some implementations, one or more steps of the method can be omitted or combined, and/or one or more additional steps can be included in the method. The method can be performed by one or more components that are illustrated in the environment of FIG. 1.

At step 605, a series of actions that were performed by the user while interacting with multiple applications is received. The series of actions can include indications of user interactions with multiple applications within a timeframe and/or that occurred between the user accessing a mobile device and then initiating an inactive mode of the mobile device. In some implementations, the user actions can include all of the steps that were performed by the user, such as screenshots of the user performing the actions. In some implementations, one or more of the user actions can include suggested API calls to the application(s) that can be provided to the application(s) to perform one or more user actions. Thus, when a template routine is executed, fewer actions may be required than the actions performed by the user, thereby increasing efficiency by requiring less computing resources.

At step 610, a routine template is selected from a plurality of candidate routine templates. For example, referring again to FIG. 3, actions of the user can be identified (e.g., action sequence 305, 310, and/or 315). Based on the actions being mapped to a template routine, the template routine (e.g., routine 300) can be selected to provide to the user. At step 615, the selected routine template is provided to the user as a routine suggestion.

At optional step 620, an indication is received that indicates the template actions are to be performed. For example, in response to receiving the route suggestion, the user may select an icon and/or notification to execute the routine. In response, an indication can be provided that indicates user interest in executing the routine. In some implementations, the indication can be automatically generated. For example, once a notification is provided, the template actions may be performed after a period of time.

At optional step 625, the template actions are performed. In some implementations, the action can be performed in the background such that the interface does not display the one or more applications that are utilized to perform the template actions. In some instances, the user can view, via the interface, what steps are being performed. In either instance, the actions can be performed automatically and without further input from the user.

Figure 7:
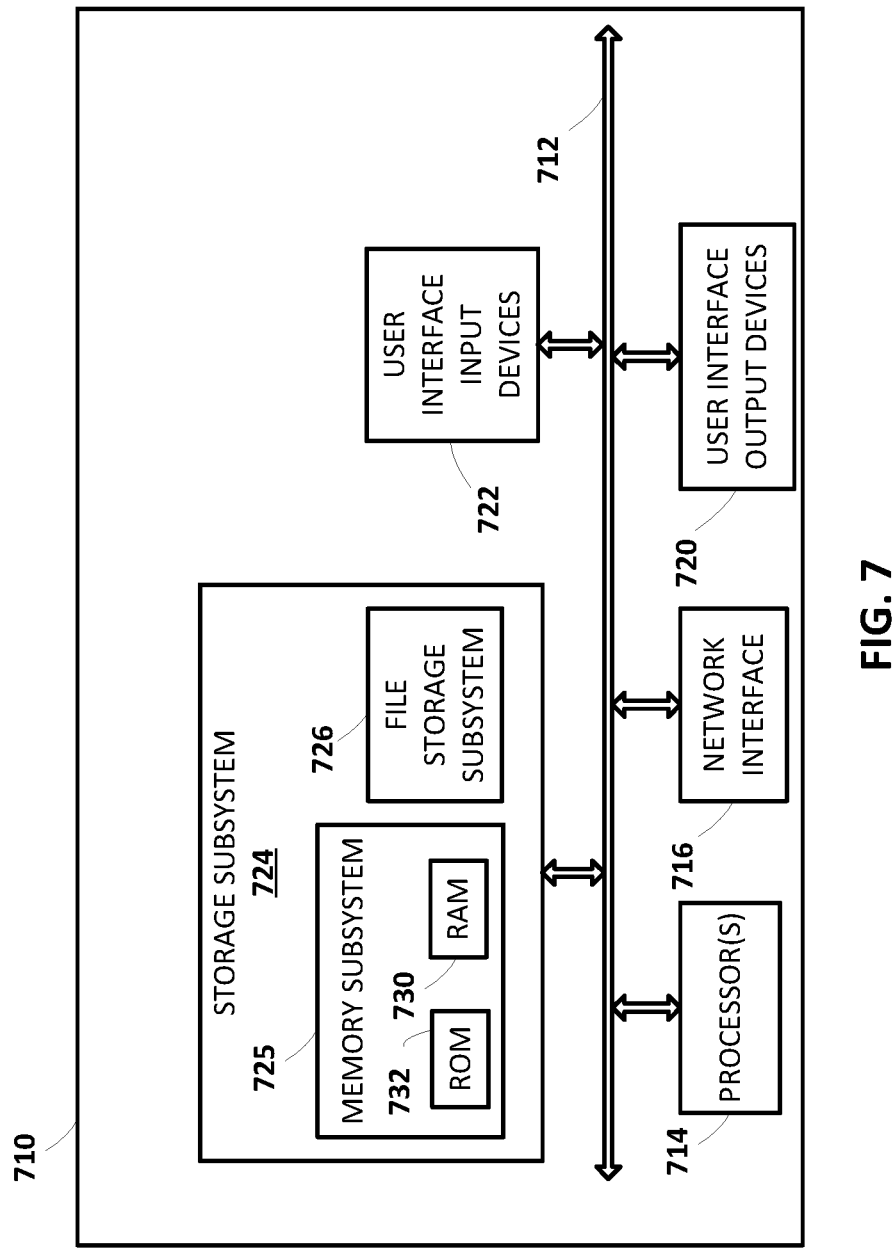
FIG. 7 illustrates an example architecture of a computing device.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the method of FIG. 3, and/or to implement various components depicted in FIG. 1.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In some implementations, a method implemented by one or more processors is provided and includes receiving a sequence of user actions, wherein the sequence indicates an order in which the user actions were performed by a user, wherein each of the user actions includes corresponding action information including: a corresponding application that the user was interacting with, via an interface of a mobile device, in performing the action, and a corresponding action that was performed via the user interacting with the corresponding application, selecting, from a plurality of candidate routine templates and based on one or more of the user actions of the sequence of user actions, a selected routine template, wherein the selected routine template is associated with one or more template actions, and providing an indication of the selected routine template to the user, as a routine suggestion, via the interface of the mobile device.

These and other implementations of the technology disclosed herein can include one or more of the following features.

In some implementations, one or more of the users actions is generated by one or more of the corresponding applications.

In some implementations, wherein one or more user actions are identified based on screenshots of the user performing the one or more user actions, wherein a single template action corresponds to the one or more user actions identified based on screenshots. In some of those implementations, the method further includes processing the plurality of screenshots includes providing the plurality of screenshots, as input, to a machine learning model, wherein the sequence of actions are determined based on output from the machine learning model.

In some implementations, the method further includes: identifying a prior sequence of user actions, wherein the prior sequence of user actions occurred prior to the sequence of user actions, and storing the prior sequence of user actions as one of the template routine actions, wherein selecting the selected routine template includes selecting the prior sequence of user actions. In some of those implementations, selecting the prior sequence of user actions is based on a number of prior instances of the user performing the prior sequence of user actions.

In some implementations, the method further includes determining, based on one or more environmental conditions and/or mobile device states of the mobile device when the sequence of user actions were performed by the user, one or more trigger criteria. Prior to providing the indication, the method further includes determining that the mobile device currently satisfies one or more of the trigger criteria, wherein providing the indication of the selected routine template to the user is in response to determining that the mobile device currently satisfies one or more of the trigger criteria. In some of those implementations, determining the one or more trigger criteria includes determining that a condition when the user performed the sequence of user actions matches a condition when the user previously performed the sequence of user actions. In other of those implementations, determining the one or more trigger criteria includes determining a first condition when the user performed the sequence of user actions, determining a first trigger based on the first condition, determining a second condition when the user performed the sequence of user actions, and determining a second trigger based on the first condition.

In some implementations, the method further includes receiving, from the user and in response to providing the indication, a request to invoke the selected routine template, and causing the one or more actions of the selected routine template to be performed.

In some implementations, the routine suggestion is provided via the interface.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
   receiving a sequence of user actions, wherein the sequence indicates an order in which the user actions were performed by a user, wherein each of the user actions includes corresponding action information including:
       a corresponding application that the user was interacting with, via an interface of a mobile device, in performing the action; and
       a corresponding action that was performed via the user interacting with the corresponding application;
   selecting, from a plurality of candidate routine templates and based on one or more of the user actions of the sequence of user actions, a selected routine template, wherein the selected routine template is associated with one or more template actions;
   determining, based on one or more environmental conditions and/or mobile device states of the mobile device when the sequence of user actions were performed by the user, one or more trigger criteria;
   determining that the mobile device currently satisfies one or more of the trigger criteria; and
   providing an indication of the selected routine template to the user, as a routine suggestion, via the interface of the mobile device, wherein providing the indication of the selected routine template to the user is in response to determining that the mobile device currently satisfies one or more of the trigger criteria.

2. The method of claim 1, wherein one or more of the user actions is generated by one or more of the corresponding applications.

3. The method of claim 1, wherein one or more user actions are identified based on screenshots of the user performing the one or more user actions, wherein a single template action corresponds to the one or more user actions identified based on screenshots.

4. The method of claim 3, further comprising:
   processing the plurality of screenshots includes providing the plurality of screenshots, as input, to a machine learning model, wherein the sequence of actions are determined based on output from the machine learning model.

5. The method of claim 1, further comprising:
   identifying a prior sequence of user actions, wherein the prior sequence of user actions occurred prior to the sequence of user actions; and
   storing the prior sequence of user actions as one of the template routine actions, wherein selecting the selected routine template includes selecting the prior sequence of user actions.

6. The method of claim 5, wherein selecting the prior sequence of user actions is based on a number of prior instances of the user performing the prior sequence of user actions.

7. The method of claim 1, wherein determining the one or more trigger criteria includes determining that a condition when the user performed the sequence of user actions matches a condition when the user previously performed the sequence of user actions.

8. The method of claim 1, wherein determining the one or more trigger criteria includes:
   determining a first condition when the user performed the sequence of user actions;
   determining a first trigger based on the first condition;
   determining a second condition when the user performed the sequence of user actions; and
   determining a second trigger based on the first condition.

9. The method of claim 1, further comprising:
receiving, from the user and in response to providing the indication, a request to invoke the selected routine template; and
causing the one or more actions of the selected routine template to be performed.

10. The method of claim 1, wherein the routine suggestion is provided via the interface.

11. A system, comprising:
one or more computers each including at least one processor and a memory storing processor-executable code, the one or more computers configured to:
receive a sequence of user actions, wherein the sequence indicates an order in which the user actions were performed by a user, wherein each of the user actions includes corresponding action information including:
a corresponding application that the user was interacting with, via an interface of a mobile device, in performing the action; and
a corresponding action that was performed via the user interacting with the corresponding application;
select, from a plurality of candidate routine templates and based on one or more of the user actions of the sequence of user actions, a selected routine template, wherein the selected routine template is associated with one or more template actions;
determine, based on one or more environmental conditions and/or mobile device states of the mobile device when the sequence of user actions were performed by the user, one or more trigger criteria;
determine that the mobile device currently satisfies one or more of the trigger criteria; and
provide an indication of the selected routine template to the user, as a routine suggestion, via the interface of the mobile device, wherein providing the indication of the selected routine template to the user is in response to determining that the mobile device currently satisfies one or more of the trigger criteria.

12. The system of claim 11, wherein the one or more computers are further configured to:
identifying a prior sequence of user actions, wherein the prior sequence of user actions occurred prior to the sequence of user actions; and
storing the prior sequence of user actions as one of the template routine actions, wherein selecting the selected routine template includes selecting the prior sequence of user actions.

13. The system of claim 12, wherein selecting the prior sequence of user actions is based on a number of prior instances of the user performing the prior sequence of user actions.

14. The system of claim 11, wherein determining the one or more trigger criteria includes determining that a condition when the user performed the sequence of user actions matches a condition when the user previously performed the sequence of user actions.

15. The system of claim 11, wherein determining the one or more trigger criteria includes:
determining a first condition when the user performed the sequence of user actions;
determining a first trigger based on the first condition;
determining a second condition when the user performed the sequence of user actions; and
determining a second trigger based on the first condition.

16. A non-transitory processor-readable medium having instructions stored thereon, which when executed by one or more processors, cause the one or more processors to implement a method, comprising:
receiving a sequence of user actions, wherein the sequence indicates an order in which the user actions were performed by a user, wherein each of the user actions includes corresponding action information including:
a corresponding application that the user was interacting with, via an interface of a mobile device, in performing the action; and
a corresponding action that was performed via the user interacting with the corresponding application;
selecting, from a plurality of candidate routine templates and based on one or more of the user actions of the sequence of user actions, a selected routine template, wherein the selected routine template is associated with one or more template actions;
determining, based on one or more environmental conditions and/or mobile device states of the mobile device when the sequence of user actions were performed by the user, one or more trigger criteria;
determining that the mobile device currently satisfies one or more of the trigger criteria; and
providing an indication of the selected routine template to the user, as a routine suggestion, via the interface of the mobile device, wherein providing the indication of the selected routine template to the user is in response to determining that the mobile device currently satisfies one or more of the trigger criteria.

17. The non-transitory processor-readable medium of claim 16, wherein the method further includes:
identifying a prior sequence of user actions, wherein the prior sequence of user actions occurred prior to the sequence of user actions; and
storing the prior sequence of user actions as one of the template routine actions, wherein selecting the selected routine template includes selecting the prior sequence of user actions.

* * * * *